Dec. 25, 1951  M. ORESCAN  2,579,955
TILTABLE TABLE BAND SAW MACHINE
Filed Dec. 16, 1947  4 Sheets-Sheet 1

Michael Orescan
INVENTOR.

BY
Attorneys

Dec. 25, 1951  M. ORESCAN  2,579,955
TILTABLE TABLE BAND SAW MACHINE
Filed Dec. 16, 1947  4 Sheets-Sheet 2

Michael Orescan
INVENTOR.

Dec. 25, 1951     M. ORESCAN     2,579,955
TILTABLE TABLE BAND SAW MACHINE

Filed Dec. 16, 1947     4 Sheets-Sheet 3

Michael Orescan
INVENTOR.

Dec. 25, 1951  M. ORESCAN  2,579,955
TILTABLE TABLE BAND SAW MACHINE
Filed Dec. 16, 1947  4 Sheets-Sheet 4
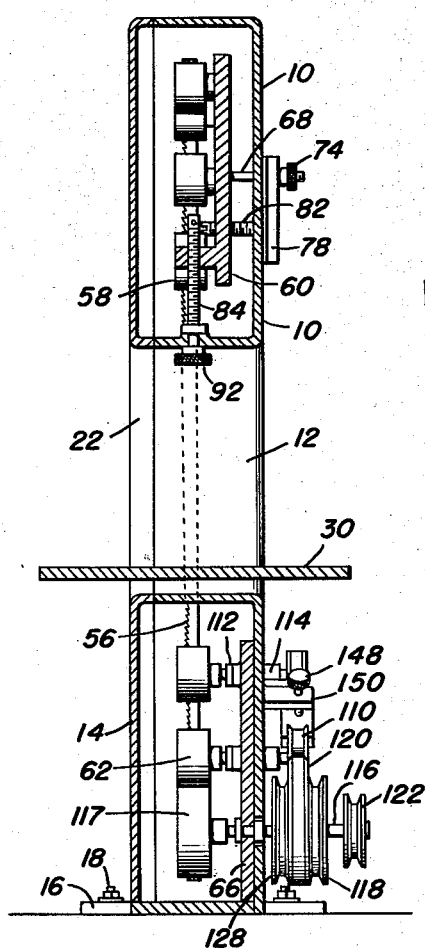
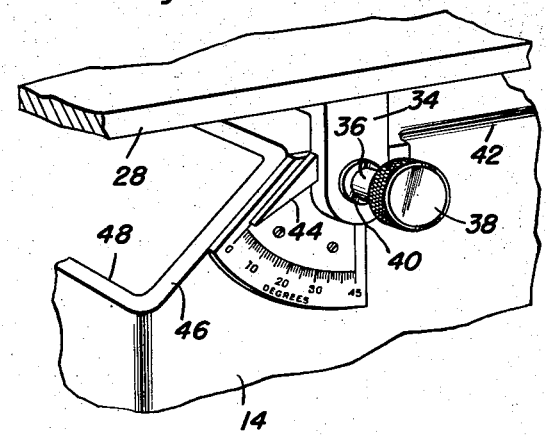
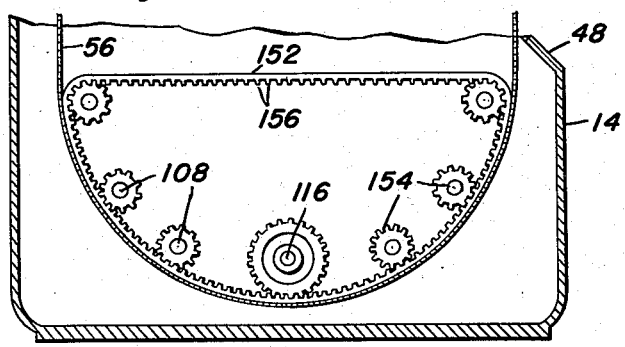
Michael Orescan
INVENTOR.

Patented Dec. 25, 1951

2,579,955

UNITED STATES PATENT OFFICE 2,579,955

TILTABLE TABLE BAND SAW MACHINE

Michael Orescan, Toronto, Ontario, Canada

Application December 16, 1947, Serial No. 791,992

3 Claims. (Cl. 143—17)

This invention relates to band saw machines and more particularly to a band saw machine of the type having an upright hollow frame with a front gap, a tiltable table, and an endless flexible band saw operatively mounted in the frame to traverse said gap, with novel means for driving said flexible band saw and for adjusting the same, together with improvements and refinements in the structure and mounting of a work receiving table and sawdust disposal means.

The primary object of this invention is the provision of a sawing machine which will accommodate a wide variety of work without unduly straining or damaging the saw.

Another salient object is to provide means for simple and accurate adjustment of the saw in two directions relative to the frame, as well as to tension the saw.

Still another object of this invention is to provide a saw machine in which a change or replacement of the saw can be expeditiously accomplished and in which the table can be adjusted to receive different types of work and at different angles while providing a deep gap and a deep flat table when in horizontal position.

Yet another object is to provide improved drive means for a band saw capable of handling heavy work without slippage and jamming of the band saw.

And a last object to be specifically mentioned is to provide a construction which is relatively inexpensive and entirely practicable to manufacture, simple and convenient as well as safe to use, and which will give generally efficient and durable service.

With these objects, as well as other inherent and specific objects which will become evident as this description proceeds, this invention resides in certain novel improvements and refinements in construction, combination and arrangement of parts and portions as will be described in the specification, particularly pointed out in the appended claims, and illustrated in the accompanying drawings which form a material part of this disclosure, and in which:

Figure 6 is a vertical sectional view, taken on the line 6—6 in Figure 2;

Figure 8 is an enlarged fragmentary view showing, in perspective, the pivotal attachment of the table; and Figure 9 is a fragmentary vertical sectional view of the base of the frame with the portion of the drive means enclosed by said base shown in elevation, this construction being a modification of the simpler structure illustrated in some of the other figures.

Similar characters of reference relate to similar or identical parts and portions throughout the specification and throughout the several views of the drawings.

Figure 1:
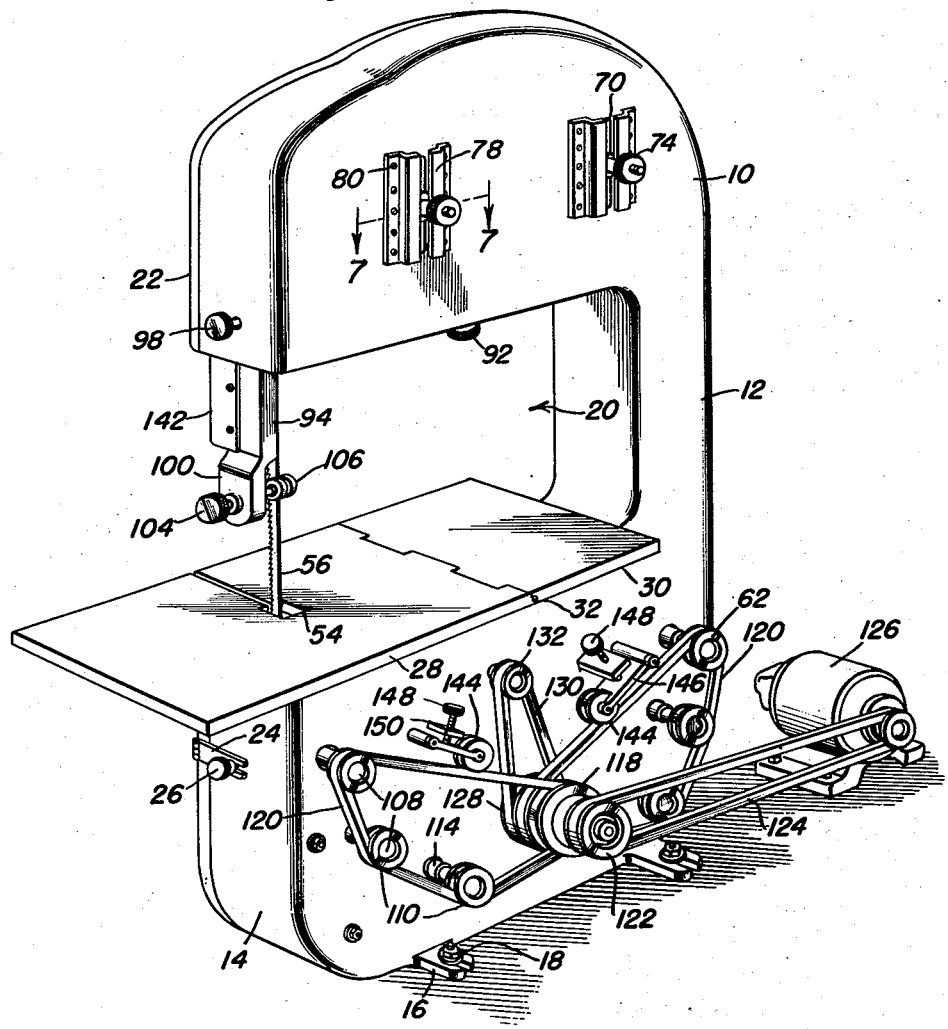
Figure 1 is a perspective view of the assembled sawing machine.

Referring now to the drawings, the frame of the machine is hollow and comprised of a head 10, back 12 and base 14 which is secured as to a floor or work bench, by attachment brackets 16 with attaching studs 18. A gap 20 is provided at the front of the machine between the head, back and base 14. Access to the interior of the frame is had through a door hinged to and forming one side of the frame and held closed by a hasp 24 and thumbscrew 26.

Figure 2:
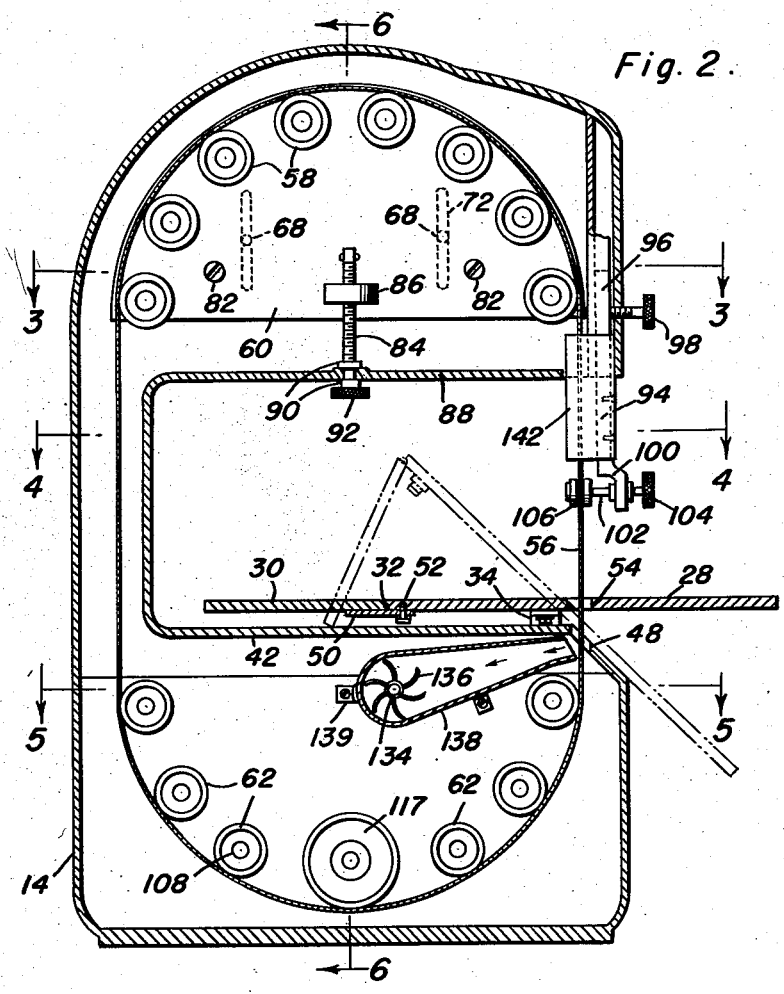
Figure 2 is a central vertical sectional view of the assembled machine, the view being taken as from the remote side of Figure 1.

Work is supported on a table comprised of the front section 28 and rear section 30 hinged thereto, as at 32, the front section being pivoted to the frame by integral depending lugs 34 and pin 36 (Fig. 8) threadedly secured on the frame and a knob 38 and shoulder 40 are provided on the pin 36 so that the table may be locked in position either horizontal or inclined as indicated in dash line in Figure 2. A scale with indicia indicating the angle of the table, in degrees, relative to the horizontal portion 42 of the bed, and an index hand 44 are provided as indicated in Figure 8. The front portion 46 of the bed is inclined and open as indicated at 48 in Figures 2 and 8. The inclined portion 46 of the bed provides rigid support for the front section 28 of the table when inclined at 45 degrees. When the table is inclined considerably, a simple lock bar 50, pivoted to the rear edge portion of the front section 28 as at 52, is turned transversely of the table to allow the sections of the table to hinge, this construction allowing the employment of a deeper table and a deeper gap 20 in the frame.

The table is apertured at 54 to receive the endless flexible band saw 56 and this saw is mounted within the frame in encircling relation on the rollers 58 rotatably mounted on semi-circular plate member 60 in the head and a plurality of similar rollers 62 rigidly mounted on shafts 108 journalled in the plate 66 in the base 14 of the machine.

Figure 7:
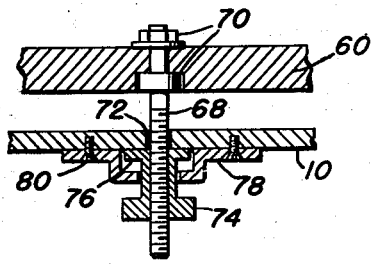
Figure 7 (Sheet 2) is an enlarged fragmentary horizontal sectional view, taken on the line 7—7 in Figure 1.

Referring to the structure in the head 10, the plate 60 is supported by the spaced bars 68, terminally fixed thereto, as at 70 in Figure 7, and extending laterally through vertical slots 72 in the side of the head 10, these bars being threaded and having thumb nuts 74 with annular flanges 76 associated with pairs of brackets 78 secured to the side of the head 10, as by screws 80, on each side of each slot 72.

Figure 3:
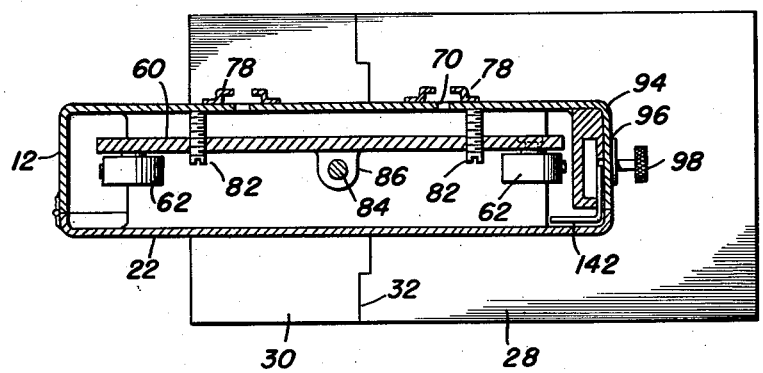
Figures 3, 4 and 5 are horizontal sectional views taken on the respective section lines in Figure 2.
Figure 4:
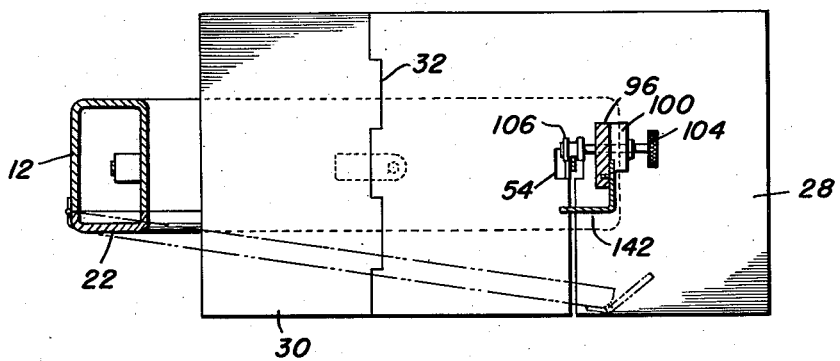

Ordinarily, the flanges 78 will bear against the side of the head 10 and a pair of set studs 82, threadedly mounted in the plate 60, are tightened against the inside of the head 10, as best indicated in Figure 3, and are used to hold the plate 60 rigidly as against movement transversely of the machine. An adjustment bolt 84 threaded through a lug 86 on one side of the plate 60 and extending through the plate 88 forming the top of the gap in the frame, is used to raise and lower the plate 60, the bolt 84 having collars 90 rigid on the bolt and engaging the plate 88 and this bolt terminates at its lower end in a knurled knob 92.

The rollers 58, as well as the rollers 62, are covered with resilient material such as rubber to minimize slippage of the saw 56. The bolt 84 and coacting structure provides for tightening and loosening the band saw, while the adjustment of the bars 68 and studs 82 provides for leveling of the saw.

The head 10 is constructed with a fixed vertical channel member 94 immediately within the front side of the head and the shank portion 96 of the saw guide assembly is vertically and adjustably mounted in this channel 94 and held in adjusted position by the thumbscrew 98. The lower end of the shank 96 may be offset as at 100 and a shaft 102 is threadedly associated with this offset portion 100, the outer end of the shaft having a fixed knob 104 to facilitate turning of the shaft having a grooved roller 106 freely rotatably mounted thereon, the groove in the roller receiving the back edge of the saw 56 to steady and guide the same.

As will be understood from the foregoing description, the rubber tired rollers 62 are driving rollers fixed to the shafts 108 which extend through the fixed side of the base 14 for rigid connection to pulleys 110. The shafts may have integral shoulders 112 and collars 114 and, as before stated, the fixed plate 66 with bearings therein is provided to support these shafts 112. The main drive shaft 116 is similarly supported and is of greater length to carry a saw engaging pulley 117 on the inside of the base and four pulleys outside the base, the center pulleys 118 driving belts 120 entrained around the pulleys 110 on either side of the shaft 116, and the outside pulley 122 having a belt 124 entrained thereon leading from a source of power such as the electric motor 126.

The inside pulley 128 drives a belt 130 entrained on a pulley 132 carried on a shaft 134 which is fixed to the fan 136 on the inside of the base 14. This fan rotates within a chute 138 supported by brackets 139 and designed to direct air motivated by the fan from the aperture 48 and to expel this air, laden with sawdust, into a suitable receiver, not shown, connected to the portion 140 of the chute extending outside the base 14.

Figure 5:
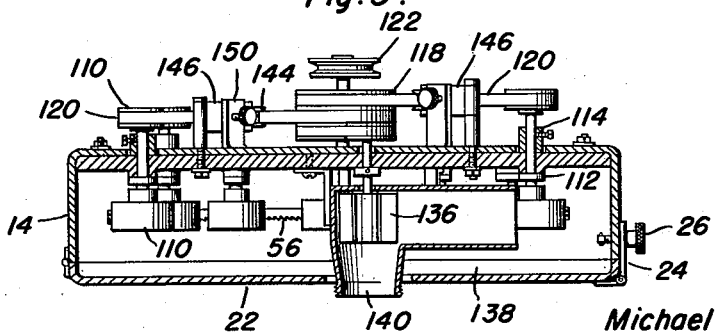

Refinements such as the band guard 142 (Fig. 1) secured to the shank 96, and belt tightened pulleys 144 carried on arms 146 (Fig. 5) pivoted on the side of the base 14 and adjusted by thumbscrews 148 threaded in lugs 150, may be added, and the modified form of drive means for the saw illustrated in Figure 9 is especially noteworthy. This modification is adapted particularly for driving band saws in large machines and where large work is to be handled. An endless belt 152 is interposed between the drive rollers and the saw, the Figure 9 illustrating rollers 154 of gear type and the belt 152 is provided with teeth 156, the teeth of the gears and belt being substantially co-extensive with the width of the belt.

The operation of this invention will be clearly understood from a consideration of the foregoing description of the mechanical details thereof taken in connection with the above recitation of the objects of this invention and it will be clear that all of these objects are amply attained.

Minor variations may be made in the details of construction and proportionment of the various elements of this invention without departure from the spirit and scope thereof which should be limited only by a proper interpretation of the terms used in the appended claims.

Having described the invention what is claimed as new is:

1. A band saw comprising an upright frame having a base and a front gap above said base, a band saw operatively mounted on said frame so as to traverse the front of said gap, the frame just below said gap having a downwardly inclined portion at the front thereof, an aperture in said portion to receive the saw, a blower operatively mounted in said base and arranged to draw air through said aperture, and a work table mounted for pivotal movement about an axis adjacent said aperture so that the work table can be pivoted into engagement with said downwardly inclined portion, said work table being sectional and hinged on a line parallel with said axis and within said gap, whereby a portion of the work table can extend into said gap substantially the full depth of the gap when the work table is horizontal, and providing for pivotal movement of a section of said portion of the work table when the rest of the work table is pivoted to a tilted position.

2. A band saw comprising a frame having a front gap, a band saw operatively mounted on said frame so as to traverse the front of said gap, a tiltable work table having a saw aperture, the frame just below the front of said gap having a downwardly inclined portion at the front thereof to support the table in an extreme tilted position, said table being sectional and hinged on a line transverse to said frame and within said gap, said inclined portion of the frame having an opening, and a suction fan operatively connected with said opening.

3. A band saw comprising an upright hollow frame having a front gap, a band saw operatively mounted in said frame so as to traverse the front of said gap, the frame just below the gap having a downwardly inclined portion at the front thereof, said inclined portion being provided with a saw aperture, a blower mounted in said frame and adapted to draw air through said aperture, and a work table mounted on said frame for pivotal movement about an axis adjacent said aperture whereby the table may be swung into supporting engagement by said downwardly inclined portion.

MICHAEL ORESCAN.

REFERENCES CITED

The following references are of record in the file of this patent:

UNITED STATES PATENTS

| Number | Name | Date |
|---|---|---|
| 104,770 | Richards et al. | June 28, 1870 |
| 144,797 | Roche et al. | Nov. 18, 1873 |
| 337,630 | Shavalier et al. | Mar. 9, 1886 |
| 383,458 | Gowen | May 29, 1888 |
| 351,672 | Vail | Oct. 26, 1888 |
| 428,785 | Rodgers | May 27, 1890 |
| 537,576 | Lounsberry | Apr. 16, 1895 |
| 691,399 | Manering | Jan. 21, 1902 |
| 1,496,035 | Thomson | June 3, 1924 |
| 2,101,343 | Ponton | Dec. 7, 1937 |
| 2,274,923 | Hedgpeth | Mar. 3, 1942 |
| 2,347,765 | Boice et al. | May 2, 1944 |

FOREIGN PATENTS

| Number | Country | Date |
|---|---|---|
| 4,793 | Great Britain | Dec. 11, 1876 |
| 327,821 | Germany | Oct. 18, 1920 |
| 36,120 | Denmark | June 21, 1926 |